UNITED STATES PATENT OFFICE 2,191,421

DUSTING COMPOSITION

Alfred M. Boyce, Riverside, Calif.; dedicated and assigned to the Government and the People of the United States No Drawing. Application December 2, 1937,
Serial No. 177,737

1 Claim. (Cl. 167—24)

This invention relates to dust mixtures adapted for use in the control of insect and mite pests on trees and plants.

Many insecticidal materials are difficult of application so as to secure uniform distribution. The mechanical difficulties encountered in obtaining uniform coverage of infested plant growth with such insecticides have led to the employment of various liquids and dusts as carriers for the insecticide, among which are oil, bentonite, diatomaceous earth, lime, talc, etc. In many cases the carriers hitherto commonly used are unsuitable or disadvantageous, and a more satisfactory carrier agent is desired.

Among the difficulties inherent to the use of oil as an insecticide carrier is the limited tolerance therefor displayed by the fruit and foliage of deciduous and tropical plants. Repeated application of oil to numerous plant species has been found to reduce the vigor and interfere with the development and normal life cycle thereof, to depress plant metabolism, and to cause other undesirable physiological disturbances.

The various mineral dusts and powders, such as bentonite, diatomaceous earth, talc, lime, etc., are acted upon by some insecticides, thereby reducing the effectiveness of the latter and forming other compounds which are soluble, so as to be rapidly leached out by water, and frequently toxic to foliage.

I have discovered that ligno-cellulosic materials are substantially non-reactive with common insecticides so that when the latter are intimately incorporated with, adsorbed on, or absorbed in a carrier composed of such ligno-cellulosic materials in finely divided form, compositions are obtained which can be employed advantageously as agricultural dusts for application to living plants, whereby uniform distribution of the insecticidal principle upon the plant surfaces and a superior control of insect and mite pests are accomplished. These compositions are conveniently handled in common dusting equipment, have superior sticking characteristics, and display properties of residual toxicity not generally inherent to dusting materials.

The ligno-cellulosic carrier may be, for example, finely divided woody material, such as nut shells, pits of stone fruits, husks, bark, wood, and the like. These and related plant products have been found to have little or no independent insecticidal activity, and to be innocuous to both plants and humans. The finely divided ligno-cellulosic material preferably should have a particle size not in excess of 100 screen mesh, material of from 300 to 400 mesh having been found particularly satisfactory. Such finely divided materials are hereinafter termed "ligno-cellulosic flour".

According to the invention, an insecticide is intimately mixed with or otherwise incorporated in an excess of a ligno-cellulosic flour in any suitable manner to secure a thorough dispersion of the toxic principle with the carrier. For example, the dry insecticide may be ground with the solid carrier until both are of suitable particle size. If the insecticide is a liquid, the solid carrier may be moistened therewith and subsequently ground. A further means for preparing the desired mixture consists in dissolving the insecticide, if soluble, in a volatile solvent, e. g., acetone, toluene, kerosene, alcohol, carbon tetrachloride, and the like, moistening and mixing the solution with finely divided solid carrier, and subsequently evaporating the solvent from the mixture. The latter procedure may be supplemented by additional grinding, if desired, but usually yields a product adapted for use in the control of plant pests without further treatment. The compositions may be further modified by the inclusion therein of various wetting, spreading, or buffering agents, and dyes.

The following examples set forth certain specific embodiments of my invention, but are not to be construed as limiting the same.

Example 1

2 pounds of 2,4-dinitro-6-cyclohexyl-phenol and 2 pounds of walnut shell flour were ground together in a ball mill until the particle size of the dust mixture was between 300 and 400 screen mesh. The walnut shell flour consisted of fine yellow-brown flakes, contained from 1 to 2 per cent by weight of water-soluble material, and tended to acidify and buffer water to a pH between 4.5 and 5.5. It had no independent toxicity to insects or mites, and was innocuous to both plants and humans. After grinding, the dust was mixed with an additional 196 pounds of walnut shell flour of 300-400 screen mesh.

The final mixture, containing about 1 per cent of the insecticide, was dusted on orange, lemon, walnut, apricot, and peach foliage in amounts ranging between 1 and 3 pounds of dust per tree. On orange and lemon trees 1.5 to 2.0 pounds of the dust per tree gave satisfactory control of citrus red mite and citrus thrips, and in the case of the red mite concontrolled newly hatched mites over a considerable period following application. A substantial kill of black scale was also accomplished by the dust application. No burning or other undesirable plant reaction resulted from the application, nor was there any problem of dust residue removal from the fruit. Trees dusted with the walnut shell flour alone and undusted controls continued to be badly infested with mites, thrips, and black scale and eventually suffered severe foliage and fruit injury therefrom.

Repeated applications of the dust were made on Navel orange and Lisbon lemon trees at approximately 10-day intervals until a total of approximately 12 pounds per tree had been applied. Although the trees were exposed to heavy dews and excessively high temperatures during this series of applications, injury directly attributable to the dust application was negligible and no unfavorable tree reaction resulted.

Similar applications were made with dusting compositions containing from 0.25 to 2.0 per cent by weight of a 2.4-dinitro-phenol compound prepared by dissolving the phenol compound in toluene, moistening and mixing walnut shell flour with the solution, and thereafter evaporating off the toluene. These dusts gave results comparable with those outlined above. Among other pests which can be killed with these dusts are common red spider, greenhouse thrips, bean thrips, flower thrips, orange tortrix, citricola scale, yellow striped army worm, Pacific mite, yellow mite, codling moth larvae, and the like.

Example 2

Dusting compositions were prepared by mixing and grinding walnut shell flour of 250–400 screen mesh particle size with cryolite ($Na_3AlF_6$) and petroleum oil. One such composition containing 60 per cent by weight of walnut shell flour, 35 per cent cryolite, and 5 per cent of a dormant oil having an unsulfonated residue of 75 per cent and a Saybolt viscosity of 100 seconds, was dusted on walnuts of the Eureka, Franquette, Payne, and Klondike varieties at 4 pounds per tree, and gave a satisfactory control of the walnut husk fly without injury to foliage and nuts.

Substitution of lime for the walnut shell flour in the composition was not satisfactory, since the cryolite tended to react with the lime. Mixtures of cryolite and oil with diatomaceous earth did not stick well on the tree and were too bulky to handle properly in conventional dusting equipment. Finely divided talc was not adapted to take up the oily constituent of the composition and could not be conveniently dusted.

Other insects which can be controlled with dusts comprising walnut shell flour and from 20 to 50 per cent of cryolite are orange tortrix and Genista caterpillar.

Example 3

In a similar manner, dusting compositions were prepared comprising walnut shell flour and from 0.1 to 0.2 per cent by weight of pyrethrins. These compositions, prepared by mixing the walnut shell flour with extract of pyrethrum flowers, were found to be non-toxic to tree and plant foliage and to give satisfactory commercial control of citrus thrips, greenhouse thrips, flower thrips, orange tortrix, etc. This dust sticks well to tree and plant surfaces, and gives a uniform deposit when applied with common dusting apparatus.

Example 4

Walnut shell flour of 250–400 screen mesh particle size was compounded substantially as described above with Cubé, derris, and other vegetable products of high rotenone content. Compositions containing from 0.5 to 1.0 per cent by weight of rotenone were dusted on insect-infested plants and deciduous and citrus trees at 1 pound per tree. All parts of the dusted trees were found to be covered by a uniform deposit of the product, and no injury resulted therefrom. Insect pests which these compositions were found to control were citrus thrips, greenhouse thrips, flower thrips, citrus aphids, and orange tortrix.

Example 5

2.0 pounds of 2.4-dinitro-6-cyclohexyl-phenol was dissolved in 4000 milliliters of toluene, and 198 pounds of finely divided redwood bark flour of from 300 to 400 screen mesh particle size was moistened therewith. This composition was thoroughly mixed and the toluene removed by evaporation. The resulting product did not tend to form agglomerates, and was readily handled in conventional dusting equipment. The redwood bark flour consisted of red transparent flakes varying in size from about 1 to 50 microns. This material was non-reactive with the phenolic compound, innocuous to plants and humans, had a slight repellent effect on insects, and tended to acidify and buffer to a pH of between about 3 and 5 when in aqueous suspension.

The dusting composition prepared as above was applied to Valencia orange and Eureka lemon trees at 1.5–2.0 pounds per tree. This dusting effected a substantially complete initial kill of immature and adult citrus red mites without injury to the tree, and killed young mites hatching over a considerable period following application. Undusted control trees developed heavy mite infestations and eventually suffered appreciable foliage and fruit injury. Trees dusted with redwood bark flour alone showed a slight initial reduction in mite population.

The composition described above was also successfully applied for control of citrus thrips on oranges and lemons at 1 to 2 pounds per tree, and for control of common red spider on Persian walnut at 3 pounds per tree.

Mixtures of from 0.25 to 2.0 per cent by weight of 2.4-dinitro-phenol compounds with redwood bark flour can advantageously be employed as dusts on deciduous and sub-tropical plants and trees for the control of such insect and mite pests as Pacific mite, yellow mite, yellow striped army worm, bean thrips, flower thrips, black scale, citricola scale, orange tortrix, six spotted mite, codling moth larvae, and others.

Example 6

Dusting compositions were prepared by grinding 2.4-dinitro-6-cyclohexyl-phenol with finely divided redwood wood flour of from 200 to 400 screen mesh particle size. This wood flour consists essentially of finely divided pink colored fibers composed principally of cellulose and lignin and is prepared by grinding or otherwise pulverizing redwood wood. It is substantially insoluble in water, non-reactive with phenols under the conditions of operation, and when wet with water or in aqueous suspension exerts an acidizing and buffering action to a pH of between approximately 3 and 5.

A composition prepared as above and containing 1.0 per cent by weight of the dinitro-phenol compound was dusted at 1 pound per tree upon Eureka lemon trees for the control of citrus thrips. No tree injury resulted from the application. Three days after the dusting, the treated plots were inspected and found substantially free of thrips infestation. Undusted control trees continued to be badly infested with the thrips and eventually suffered severe fruit scarring and foliage injury directly attributable thereto. This composition was useful for the same purposes and effective against the same types of insect and mite pests as was the case with the dinitrophenolic-redwood bark mixtures.

Compositions similar to those described in the foregoing examples were tested to determine the residual toxicity of dust deposits thereof against insect and mite pests. The procedure followed consisted in precision dusting freshly picked and washed grapefruit of 4 inches diameter, and weathering the dust fruit by exposure to sunlight, wind, and dew. The weathered fruit were then infested with the test insect or mite and incubated at 80° F. and at 60 per cent relative humidity for a period of several hours. The surface of each fruit was thereafter examined under a microscope and the number of dead and living insects or mites thereon determined.

Of the compositions tested, typical results were obtained with a dust containing 1.0 per cent by weight of 2.4-dinitro-6-cyclohexyl-phenol in redwood bark flour which, when dusted on grapefruit at 1 gram per fruit, gave an initial kill of 100 per cent of adult female citrus red mites and after 12 days weathering was still toxic to an average of 96.6 per cent of the mites placed on the dusted fruit surface. A composition containing 1.0 per cent by weight of 2.4-dinitro-6-cyclohexyl-phenol in walnut shell flour gave a 96 per cent mortality of the mites after 12 days. Walnut shell flour alone gave a control of only 12.5 per cent of the test mites.

Other ligno-cellulosic materials may be employed in finely divided form substantially as described above in the preparation of insecticidal dusting compositions, such as the flour prepared from coconut shells, pecan shells, Brazil nut shells, peach pits, cherry pits, apricot pits, olive pits, plum pits, cedar wood and bark, birch, and similar ligno-cellulosic products. Representative compositions which may be prepared therefrom and employed as insecticidal and arachnidicidal dusts substantially as described in the foregoing examples are the following:

| | Per cent by weight |
|---|---|
| Composition 1: | |
| Lead arsenate | 35 |
| Coconut shell flour | 65 |
| Composition 2: | |
| Nicotine sulphate | 5 |
| Peach pit flour | 95 |
| Composition 3: | |
| Butyl-carbitol-thiocyanate | 5 |
| Birch wood flour | 95 |
| Composition 4: | |
| Dimethyl-amino-phenyl-isocyanate | 3 |
| Brazil nut shell flour | 97 |
| Composition 5: | |
| Thio-diphenyl-amine | 40 |
| Walnut shell flour | 60 |
| Composition 6: | |
| Barium fluosilicate ($BaSiF_6$) | 30 |
| Cedar wood flour | 70 |

Among other insecticides which may be incorporated with the ligno-cellulosic flours substantially as described in the foregoing examples are phenothioxine, 2.4-dinitro-6-tertiary-butyl phenol, 2.4-dinitro-5-isoamyl phenol, 2.4-dinitro-6-normal hexyl phenol, 2.4-dinitro-6-secondary-octyl phenol, dinitro-naphthol, calcium arsenate, Bordeaux mixtures, nicotine, sulphur, sodium fluoride, and the like. Mixtures of the above compounds with finely divided wood flours may be employed for the control of insect and mite pests, generally, on deciduous and citrus fruit trees, ornamentals, flowers, and other plants.

Other modes of applying the principle of my invention may be employed instead of those explained, change being made as regards the materials or amounts thereof employed, provided the products claimed in the following claim be thereby obtained.

I therefore particularly point out and distinctly claim as my invention:

An insecticidal dust comprising as a major constituent walnut shell flour of smaller particle size than 100 screen mesh and a relatively small amount of an insecticidal toxicant selected from the class consisting of the extracts of rotenone- and pyrethrin-bearing plants intimately incorporated therewith.

ALFRED M. BOYCE.